(12) United States Patent
Eguchi

(10) Patent No.: US 10,197,779 B2
(45) Date of Patent: Feb. 5, 2019

(54) OPTICAL SYSTEM AND IMAGE PICKUP APPARATUS INCLUDING THE SAME

(71) Applicant: CANON KABUSHIKI KAISHA, Tokyo (JP)

(72) Inventor: Yosuke Eguchi, Saitama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/280,665

(22) Filed: Sep. 29, 2016

(65) Prior Publication Data

US 2017/0108679 A1    Apr. 20, 2017

(30) Foreign Application Priority Data

Oct. 14, 2015 (JP) .................. 2015-203190

(51) Int. Cl.
| G02B 15/177 | (2006.01) |
| H04N 5/341 | (2011.01) |
| H04N 5/369 | (2011.01) |
| G02B 13/06 | (2006.01) |
| G02B 5/00 | (2006.01) |
| G02B 27/00 | (2006.01) |

(52) U.S. Cl.
CPC .......... *G02B 15/177* (2013.01); *G02B 13/06* (2013.01); *H04N 5/3415* (2013.01); *H04N 5/369* (2013.01); *G02B 5/005* (2013.01); *G02B 27/0025* (2013.01)

(58) Field of Classification Search
CPC ... G02B 9/00; G02B 9/02; G02B 9/04; G02B 9/10; G02B 9/06; G02B 9/08
USPC ....... 359/691, 708, 713, 745, 748, 749, 753, 359/754, 755
See application file for complete search history.

(56) References Cited

U.S. PATENT DOCUMENTS

| 7,046,458 B2 * | 5/2006 | Nakayama ............. G02B 13/06 359/725 |
| 2015/0346467 A1 | 12/2015 | Tomioka |
| 2016/0062090 A1 | 3/2016 | Kawamura |

FOREIGN PATENT DOCUMENTS

JP       2006-17837 A      1/2006

* cited by examiner

*Primary Examiner* — Robert E Tallman
(74) *Attorney, Agent, or Firm* — Canon U.S.A., Inc. IP Division

(57) ABSTRACT

At least one embodiment of an optical system includes, in order from an object side to an image side, a front unit including a plurality of lenses, an aperture stop, and a rear unit having a positive refractive power. In at least one embodiment, four negative lenses are consecutively arranged from a side of the front unit closest to the object side, and a focal length of the front unit and a focal length of the rear unit are appropriately set.

11 Claims, 11 Drawing Sheets

OPTICAL SYSTEM AND IMAGE PICKUP APPARATUS INCLUDING THE SAME

BACKGROUND OF THE INVENTION

Field of the Invention

The present disclosure relates to an optical system, including a fish-eye lens, and an image pickup apparatus including the optical system, and is suitably used for, for example, an image pickup apparatus using an image pickup element, such as a digital still camera, a video camera, a monitoring camera, or a broadcasting camera, or an image pickup apparatus such as a camera using a silver-halide film.

Description of the Related Art

In recent years, image pickup apparatuses using a solid-state image pickup element, such as a monitoring camera or a video camera, have been highly functionalized and entirely reduced in size. An optical system used in these apparatuses is required to have a compact size and high optical performance. Further, the optical system is required to have a wide viewing angle to enable image taking in a wide range by a single image pickup apparatus.

A fish-eye lens is known as an optical system that allows a region having a total angle of view of about 180 degrees to be imprinted within an image circle of a specific size. Japanese Patent Laid-Open No. 2006-17837 discloses a fish-eye lens in which three negative lenses are consecutively arranged from a side of the fish-eye lens closest to an object side to enhance resolution.

As projection methods for the fish-eye lens, an orthogonal projection method, an equisolid angle projection method, an equidistance projection method, and a stereographic projection method are known. Among these projection methods, in the stereographic projection method, an image near the optical axis is strongly compressed, and the compression effect is weakened toward the periphery. Hence, for example, distortion aberration and spherical aberration are conspicuous. For this reason, the optical system provided for the stereographic projection method is required to be properly corrected for various aberrations such as distortion aberration and spherical aberration.

Since the power arrangement is not appropriate in a front unit on an object side of an aperture stop and a rear unit on an image side of the aperture stop in the optical system of Japanese Patent Laid-Open No. 2006-17837, for example, distortion aberration and spherical aberration are apt to remain when an image is picked up by the stereographic projection method.

SUMMARY OF THE INVENTION

An optical system according to an aspect of the present disclosure includes, in order from an object side to an image side, a front unit including a plurality of lenses, an aperture stop, and a rear unit having a positive refractive power. The front unit includes four negative lenses consecutively arranged from a side closest to the object side, and the following conditional expression is satisfied:

$-0.90 < fr/ff < 0.75$, where ff represents a focal length of the front unit and fr represents a focal length of the rear unit.

According to other aspects of the present disclosure, one or more additional optical systems, one or more image pickup apparatuses, and one or more methods for use with same are discussed herein. Further features of the present disclosure will become apparent from the following description of exemplary embodiments with reference to the attached drawings.

DESCRIPTION OF THE EMBODIMENTS

At least one embodiment of an optical system and an image pickup apparatus including the optical system according to the present disclosure will be described in detail below with reference to the attached drawings. At least one embodiment of the optical system of the present disclosure includes, in order from an object side to an image side, a front unit including a plurality of lenses, an aperture stop, and a rear unit having a positive refractive power.

Figure 1:
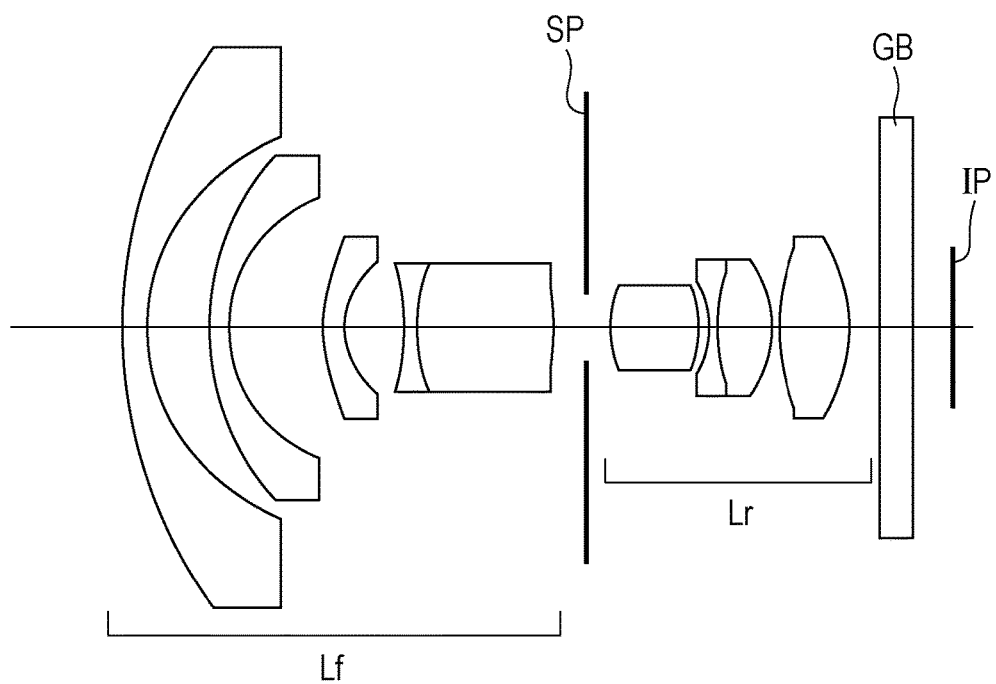
FIG. 1 is a lens sectional view of an optical system according to a first embodiment.
Figure 2:
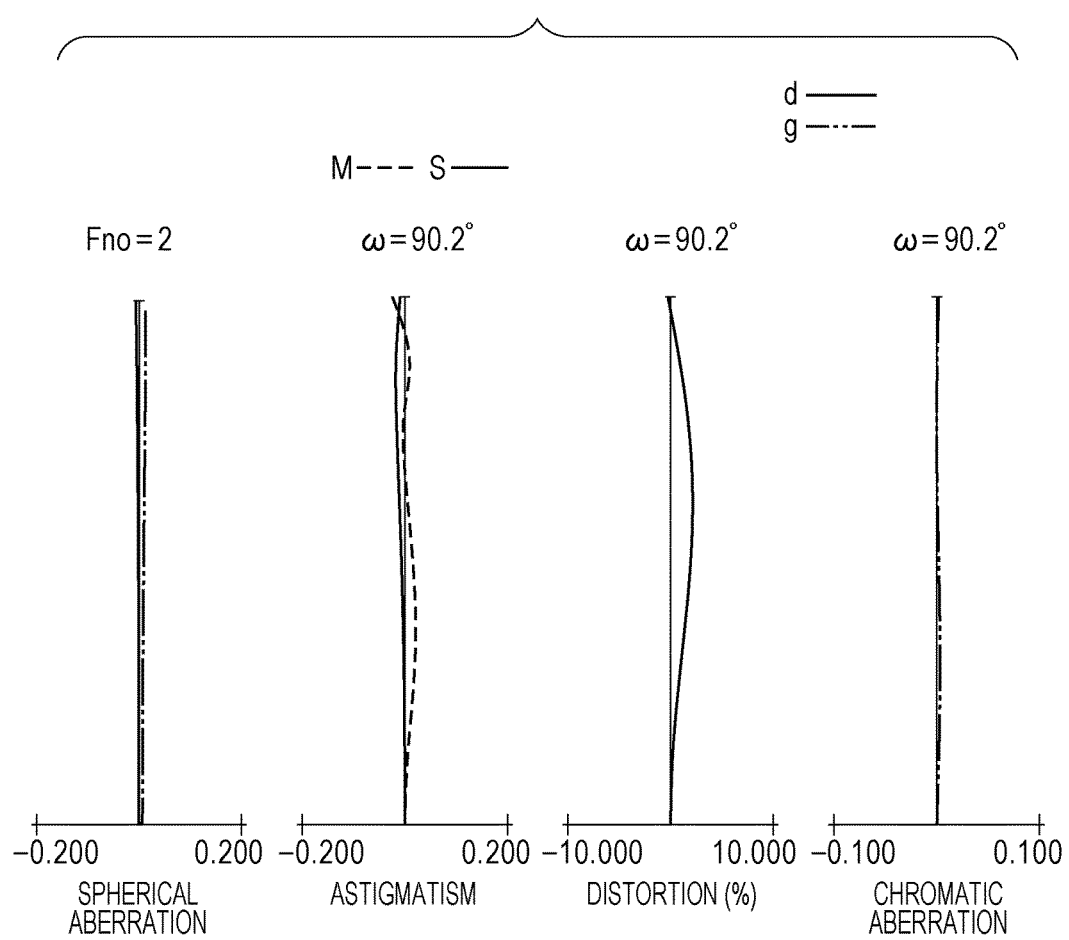
FIG. 2 is an aberration diagram of the optical system according to the first embodiment.
Figure 3:
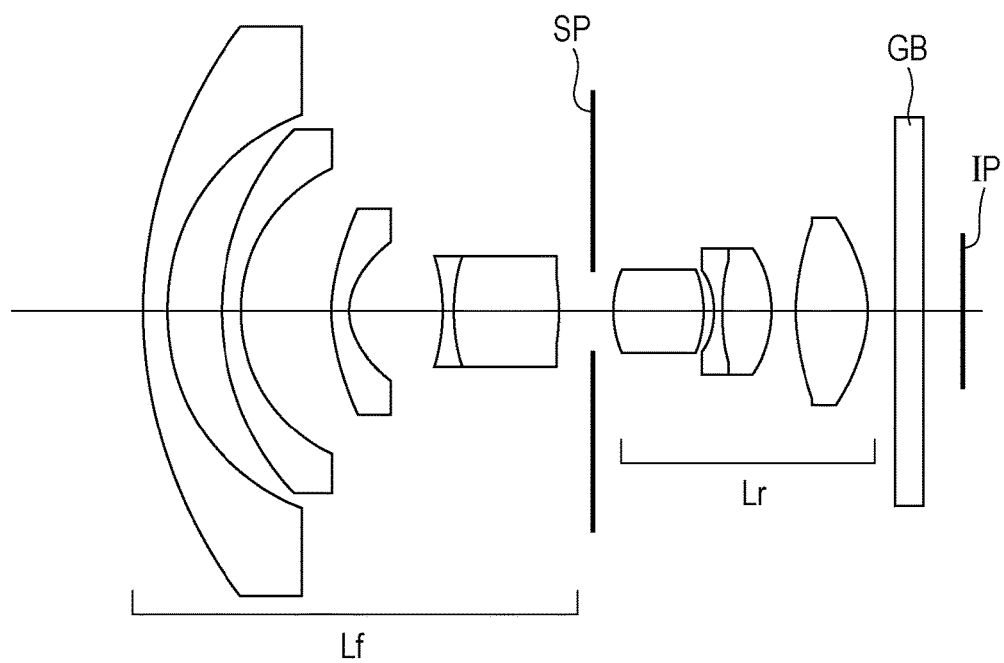
FIG. 3 is a lens sectional view of an optical system according to a second embodiment.
Figure 4:
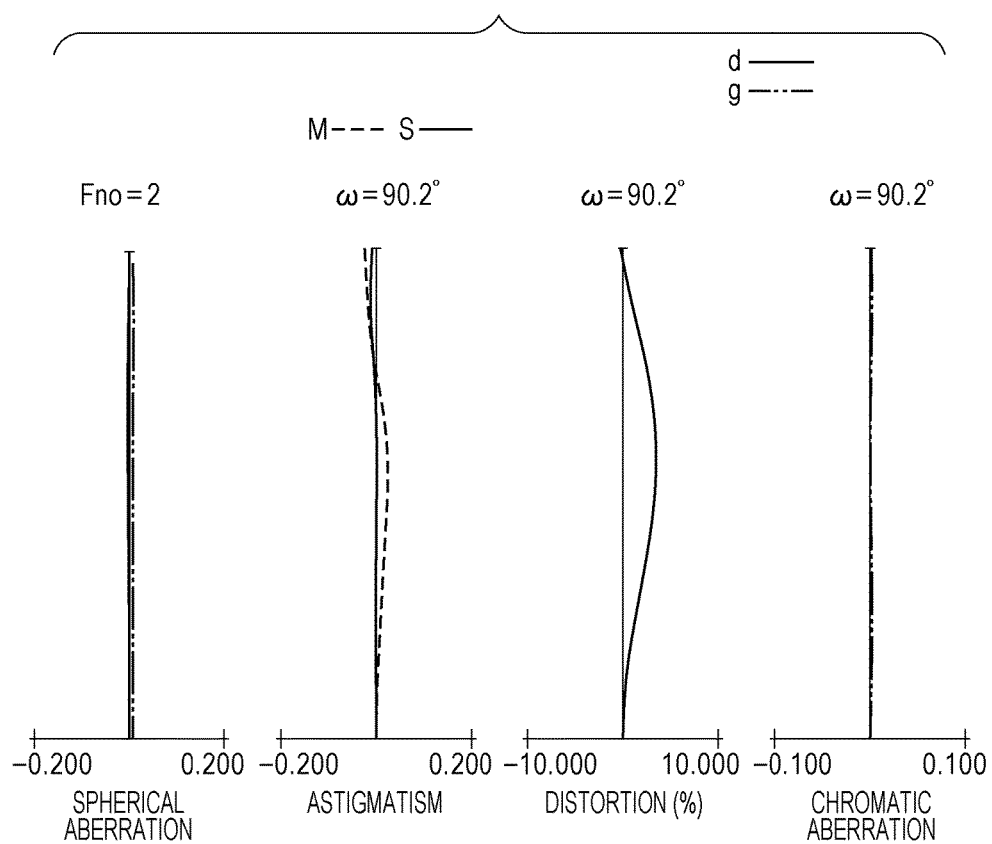
FIG. 4 is an aberration diagram of the optical system according to the second embodiment.
Figure 5:
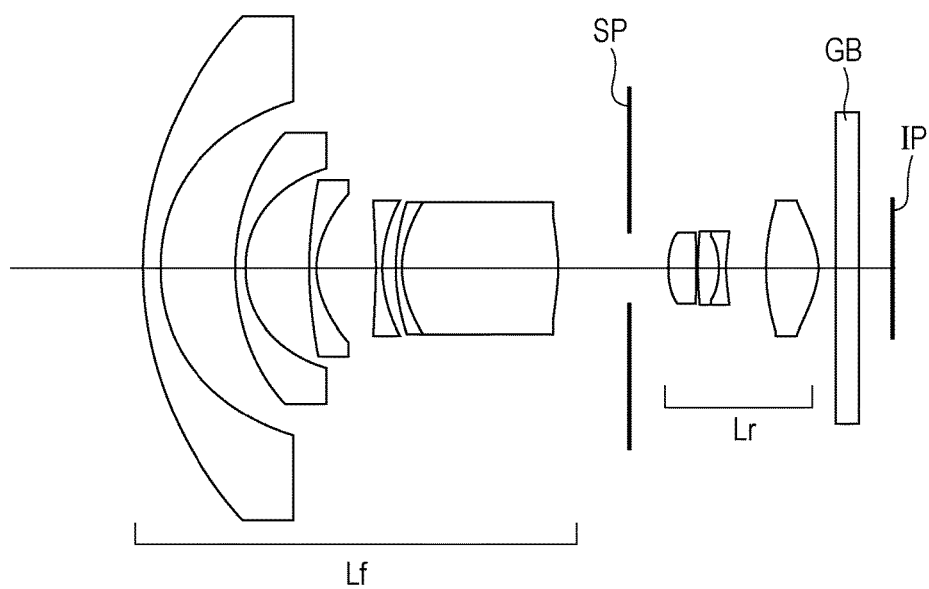
FIG. 5 is a lens sectional view of an optical system according to a third embodiment.
Figure 6:
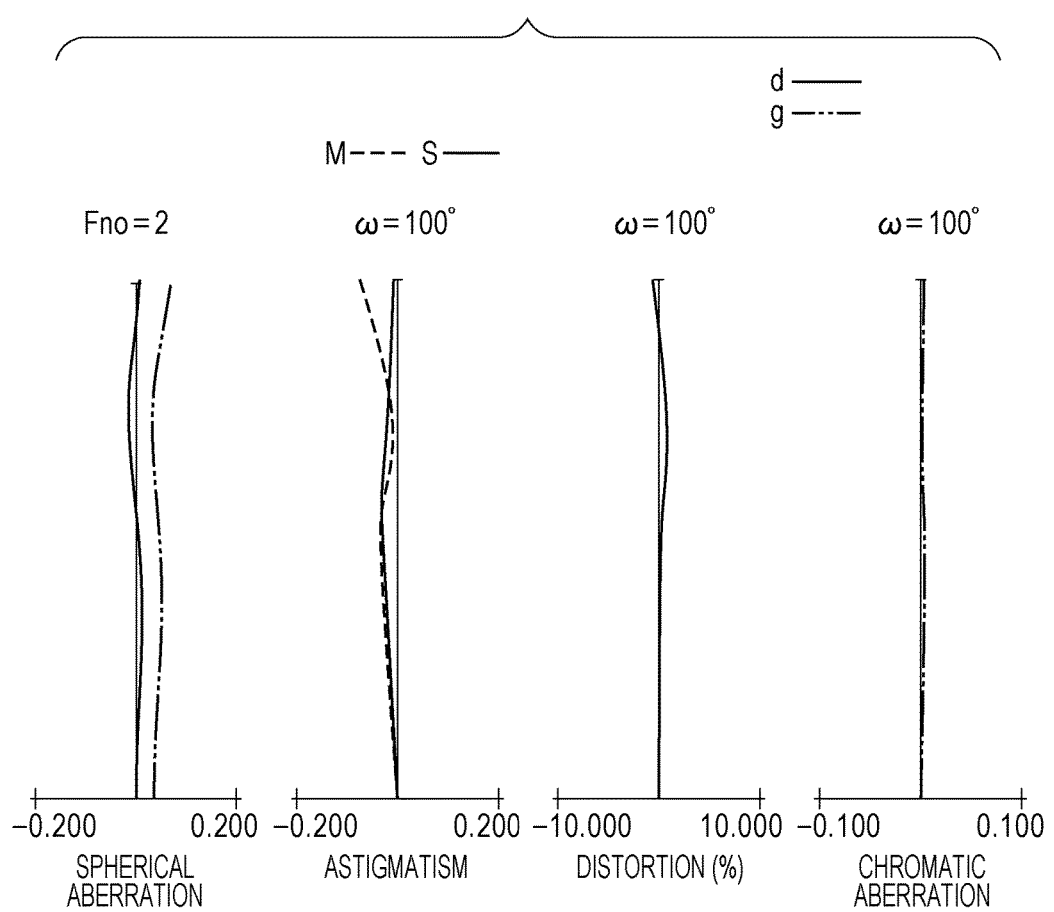
FIG. 6 is an aberration diagram of the optical system according to the third embodiment.

FIG. 1 is a lens sectional view of an optical system according to a first embodiment. FIG. 2 is an aberration diagram of the optical system of the first embodiment. The optical system of the first embodiment has a half angle of view of 90.20° and an F-number of about 2.00. FIG. 3 is a lens sectional view of an optical system according to a second embodiment. FIG. 4 is an aberration diagram of the optical system of the second embodiment. The optical system of the second embodiment has a half angle of view of 90.20° and an F-number of about 2.00. FIG. 5 is a lens sectional view of an optical system according to a third embodiment. FIG. 6 is an aberration diagram of the optical system of the third embodiment. The optical system of the third embodiment has a half angle of view of 100.00° and an F-number of about 2.00.

Figure 7:
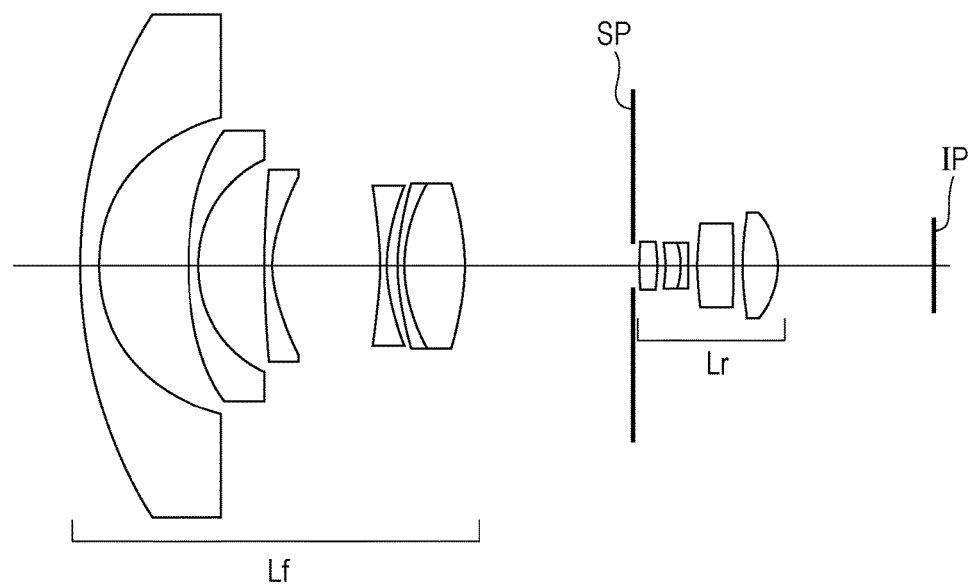
FIG. 7 is a lens sectional view of an optical system according to a fourth embodiment.
Figure 8:
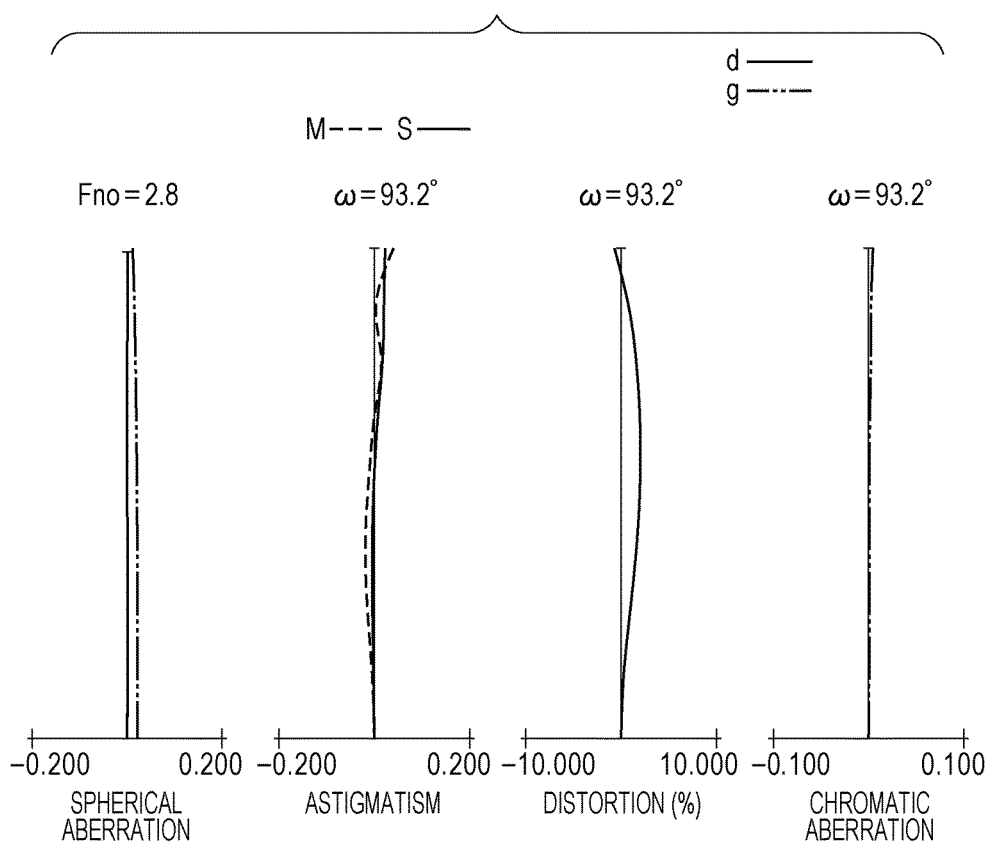
FIG. 8 is an aberration diagram of the optical system according to the fourth embodiment.
Figure 9:
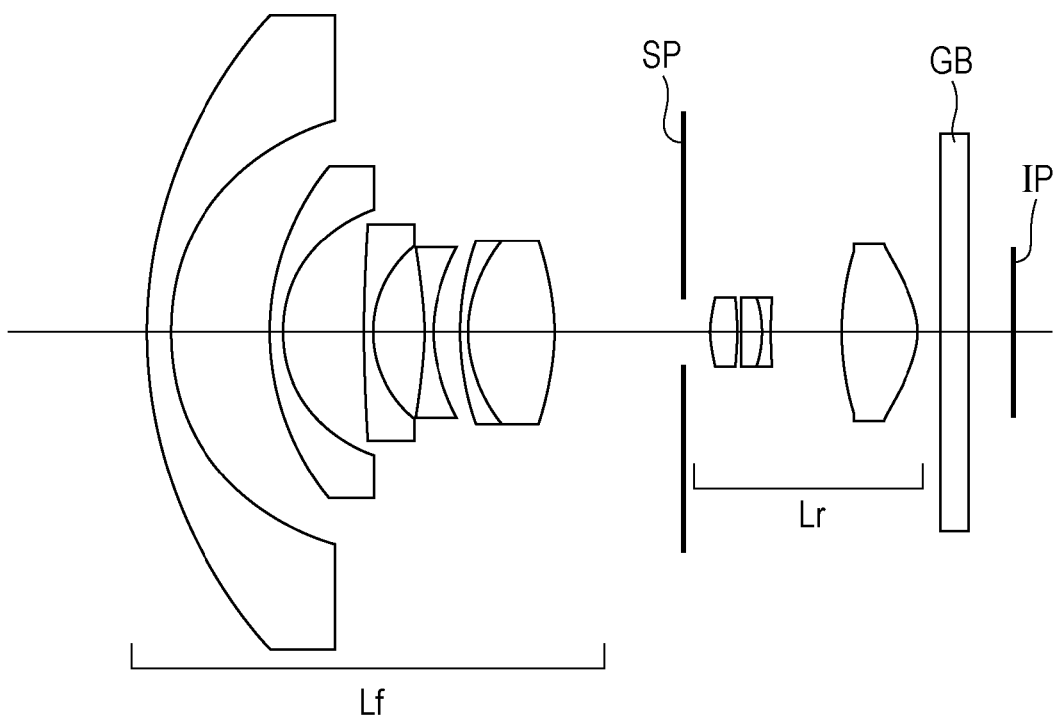
FIG. 9 is a lens sectional view of an optical system according to a fifth embodiment.
Figure 10:
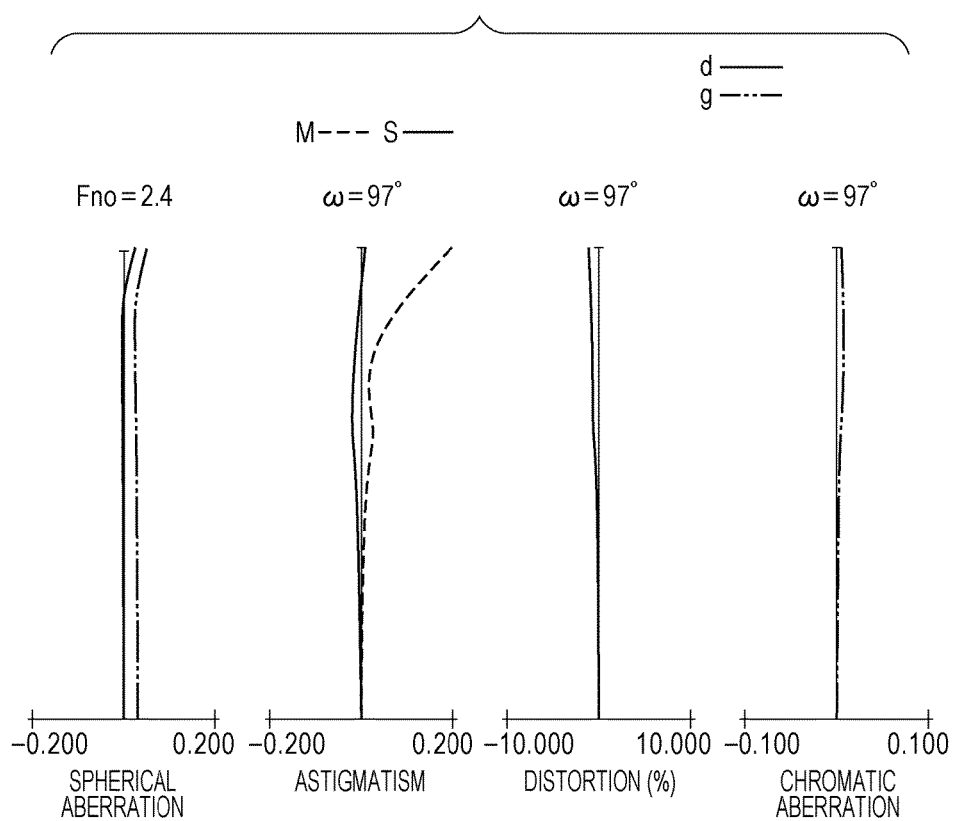
FIG. 10 is an aberration diagram of the optical system according to the fifth embodiment.

FIG. 7 is a lens sectional view of an optical system according to a fourth embodiment. FIG. 8 is an aberration diagram of the optical system of the fourth embodiment. The optical system of the fourth embodiment has a half angle of view of 93.20° and an F-number of about 2.80. FIG. 9 is a lens sectional view of an optical system according to a fifth embodiment. FIG. 10 is an aberration diagram of the optical system of the fifth embodiment. The optical system of the fifth embodiment has a half angle of view of 97.00° and an F-number of about −2.40.

Figure 11:
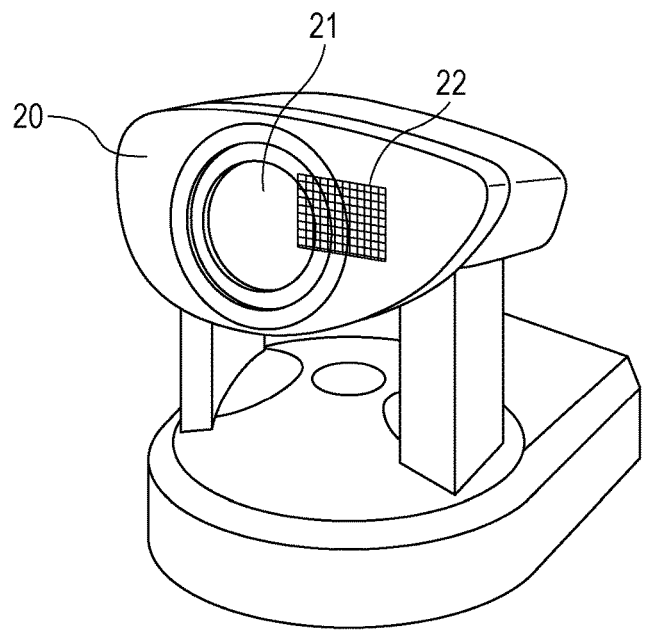
FIG. 11 is a schematic view of a principal part of at least one embodiment of an image pickup apparatus according to the present disclosure.

FIG. 11 is a schematic view of the principal part of a monitoring camera (image pickup apparatus) including the optical system in accordance with at least one embodiment of the present disclosure. The optical system of each of the embodiments is an image taking lens system used in an image pickup apparatus such as a digital still camera, a video camera, a monitoring camera, or a broadcasting camera. In each lens sectional view, the left side is the object side, and the right side is the image side. In each lens sectional view, Lf denotes a front unit, and Lr denotes a rear unit. SP denotes an aperture stop.

GB denotes an optical block corresponding to an optical filter, a face plate, a low-pass filter, or an infrared cut-off filter, and IP denotes an image plane. When at least one embodiment of the optical system of the present disclosure is used as an image pickup optical system for a video camera or a monitoring camera, the image plane IP corresponds to a solid-state image pickup element (photoelectric conversion element) such as a CCD sensor or a CMOS sensor. When at least one embodiment of the optical system of the present disclosure is used as an image pickup optical system for a silver-halide film camera, the image plane IP corresponds to a film surface.

In each spherical aberration diagram, Fno denotes the F-number and shows spherical aberrations for a d-line (wavelength 587.6 nm) and a g-line (wavelength 435.8 nm). In each astigmatism diagram, S denotes a sagittal image plane, and M denotes a meridional image plane. Distortion aberration is shown for the d-line. In each chromatic aberration diagram, lateral chromatic aberrations for the d-line and the g-line are shown, and ω denotes the image pickup half angle of view. The distortion aberration is shown as the distortion amount in a stereographic projection method to be described later.

At least one embodiment of the optical system of the present disclosure has an angle of view of about 180°, and is intended to be mainly used as a fish-eye lens. As projection methods of the fish-eye lens, an orthogonal projection method, an equisolid angle projection method, an equidistance projection method, and a stereographic projection method are known, as described above. Here, when the image height on the projection plane is designated as Y, the focal length of the entire optical system is designated as f, and the half angle of view is designated as ω, the projection methods are expressed by the following expressions:

Orthogonal projection method: $Y=f \times \sin \omega$      (A)

Equisolid angle projection method: $Y=2f \times \sin(\omega/2)$      (B)

Equidistance projection method: $Y=f \times \omega$      (C)

Stereographic projection method: $Y=2f \times \tan(\omega/2)$      (D)

Figure 12:
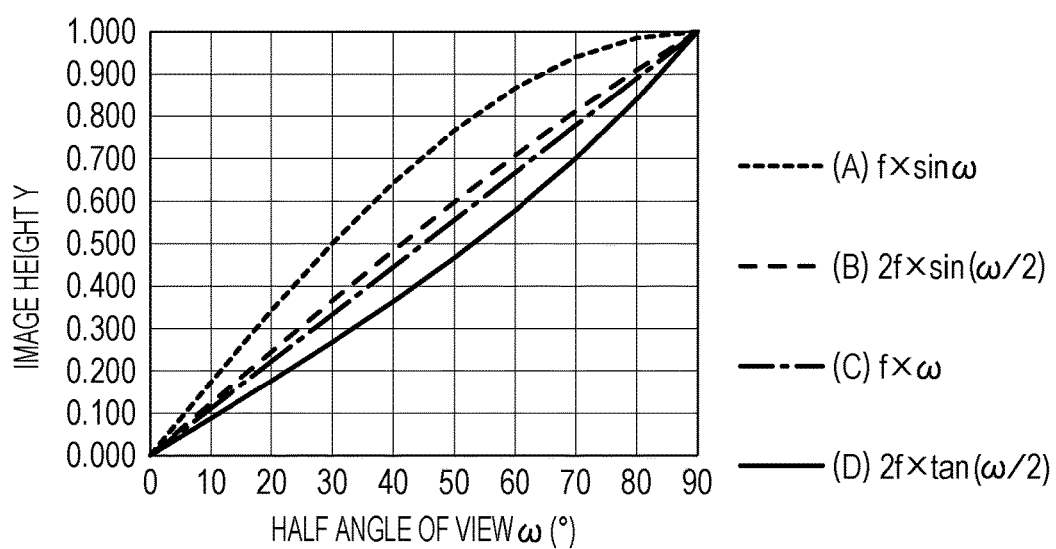
FIG. 12 shows characteristics of projection methods.

FIG. 12 schematically shows the relationship between the half angle of view and the image height when the image height at a half angle of view of 90° is 1 in the projection methods. In (A) the orthogonal projection method, an image is not so strongly compressed near the center of the image area, but is strongly compressed on the periphery of the image area. In contrast, in (D) the stereographic projection method, an image is strongly compressed near the center of the image area, but is not so strongly compressed on the periphery of the image area. In the stereographic projection method, since the degree of deformation of the image is low in the peripheral area, the influence of aberration is also conspicuous in the peripheral area. For this reason, the optical system provided for the stereographic projection method is also required to have high optical performance in the peripheral area.

A monitoring camera is also required to take a clear peripheral image, and the stereographic projection method is often used when a fish-eye lens is applied to the monitoring camera. At least one embodiment of the optical system of the present disclosure is intended to be mainly used in the fish-eye lens. To obtain high optical performance in the stereographic projection method, the optical system is required to be properly corrected for distortion aberration and spherical aberration.

Accordingly, in at least one embodiment of the optical system of the present disclosure, four negative lenses are consecutively arranged from a side of the front unit Lf closest to the object side. To achieve wide viewing angle, an off-axis light beam needs to be greatly refracted by the negative lenses disposed on the object side of the front unit Lf. To greatly refract the light beam, it is necessary to increase the refractive power of the negative lenses. Here, when the off-axis light beam is greatly refracted by a small number of negative lenses, the refractive power of each negative lens excessively increases, and much distortion aberration, field curvature, and astigmatism occur.

In at least one embodiment of the present disclosure, the negative refractive power is shared by four negative lenses consecutively arranged from the side of the front unit Lf closest to the object side. This can reduce the refractive power of the negative lenses included in the front unit Lf, and can effectively suppress the occurrence of distortion aberration, field curvature, astigmatism, and so on.

The optical system of each of the embodiments satisfies the following conditional Expression:

$$-0.90 < fr/ff < 0.75 \quad (1)$$

where ff represents the focal length of the front unit Lf, and fr represents the focal length of the rear unit Lr.

Conditional Expression (1) defines the ratio of the focal length ff of the front unit Lf and the focal length fr of the rear unit Lr. When the value is smaller than the lower limit value of Conditional Expression (1), the negative refractive power of the front unit Lf becomes too strong, and the diverging effect of the marginal ray near the aperture stop becomes too large. As a result, it is necessary to increase the refractive power of the positive lens disposed in the rear unit Lr near the aperture stop, and this makes it difficult to properly correct spherical aberration occurring in the rear unit Lr. Further, if the positive refractive power is dispersed by increasing the number of positive lenses included in the rear unit Lr in order to correct spherical aberration, the number of lenses increases, and this increases the total size of the optical system.

When the value is larger than the upper limit value of Conditional Expression (1), the positive refractive power of the front unit Lf becomes too strong, and the converging effect of the marginal ray near the aperture stop becomes too large. As a result, the height of a light beam entering the rear unit Lr becomes too small, and it is difficult to properly correct aberration, such as axial chromatic aberration, occurring in the front unit Lf.

In each embodiment, the elements are appropriately set to satisfy Conditional Expression (1), as described above. Thus, it is possible to obtain a compact and wide-angle zoom lens having high optical performance.

In each embodiment, the numerical range of Conditional Expression (1) is preferably set as follows:

$$-0.85 < fv/ff < 0.70 \quad (1a).$$

The numerical range of Conditional Expression (1) is more preferably set as follows:

$$-0.80 < fv/ff < 0.65 \quad (1b).$$

In each embodiment, it is further preferable to satisfy at least one of the following conditional expressions:

$$1.20 < (G1R1+G1R2)/(G1R1-G1R2) < 4.50 \quad (2)$$

$$1.10 < (G2R1+G2R2)/(G2R1-G2R2) < 5.00 \quad (3)$$

$$1.00 < (G3R1+G3R2)/(G3R1-G3R2) < 3.20 \quad (4)$$

$$0.00 \le |(R1+R2)|/(R1-R2) \le 1.00 \quad (5)$$

$$7.00 < TD/f < 45.00 \quad (6).$$

Here, G1R1 and G1R2 represent the curvature radii of an object-side lens surface and an image-side lens surface, respectively, of the lens disposed closest to the object side in the front unit Lf. G2R1 and G2R2 represent the curvature radii of an object-side lens surface and an image-side lens surface, respectively, of the second lens from the object side in the front unit Lf. G3R1 and G3R2 represent the curvature radii of an object-side lens surface and an image-side lens surface, respectively, of the third lens from the object side in the front unit Lf. Further, R1 represents the curvature radius of a lens surface of the rear unit Lr closest to the object side, R2 represents the curvature radius of a lens surface of the rear unit Lr closest to the image side, TD represents the distance on the optical axis from the lens surface of the front unit Lf closest to the object side to the lens surface of the rear unit Lr closest to the image side, and f represents the focal length of the entire optical system.

Conditional Expression (2) defines the shape of a negative lens G1 disposed on a side of the front unit Lf closest to the object side. Conditional Expression (2) shows that the negative lens G1 disposed on the side of the front unit Lf closest to the object side has a meniscus shape that is convex to the object side. When the value is smaller than the lower limit value of Conditional Expression (2), the curvature radius of the object-side lens surface of the negative lens G1 becomes too large. As a result, the refracting angle of the light beam that forms an image at the peripheral image height becomes too large, and much distortion aberration, field curvature, and astigmatism occur. When the value is larger than the upper limit value of Conditional Expression (2), the curvature radius of the object-side lens surface of the negative lens G1 is too close to the curvature radius of the image-side lens surface. As a result, the negative refractive power of the negative lens G1 becomes too weak, and it is difficult to achieve a sufficiently wide viewing angle.

Conditional Expression (3) defines the shape of the second negative lens G2 from the object side in the front unit Lf. Conditional Expression (3) shows that the negative lens G2 has a meniscus shape that is convex to the object side. When the value is smaller than the lower limit value of Conditional Expression (3), the curvature radius of the object-side lens surface of the negative lens G2 becomes too large. As a result, the refracting angle of a light beam that forms an image at the peripheral image height becomes too large, and much distortion aberration, field curvature, and astigmatism occur. When the value is larger than the upper limit value of Conditional Expression (3), the curvature radius of the object-side lens surface of the negative lens G2 is too close to the curvature radius of the image-side lens surface. As a result, the negative refractive power of the negative lens G2 becomes too weak, and it is difficult to achieve a sufficiently wide viewing angle.

Conditional Expression (4) defines the shape of the third negative lens G3 from the object side in the front unit Lf. Conditional Expression (3) shows that the negative lens G3 has a meniscus shape that is convex to the object side. When the value is smaller than the lower limit value of Conditional Expression (4), the curvature radius of the object-side lens surface of the negative lens G3 becomes too large. As a result, the refracting angle of the light beam that forms an image at the peripheral image height becomes too large, and much distortion aberration, field curvature, and astigmatism occur. When the value is larger than the upper limit value of Conditional Expression (4), the curvature radius of the object-side lens surface of the negative lens G3 is too close to the curvature radius of the image-side lens surface. As a result, the negative refractive power of the negative lens G3 becomes too weak, and it is difficult to achieve a sufficiently wide viewing angle.

Conditional Expression (5) defines the curvature radius R1 of the lens surface of the rear unit Lr closest to the object side and the curvature radius R2 of the lens surface of the rear unit Lr closest to the image side. Conditional Expression (5) shows that both the lens surface of the rear unit Lr closest to the object side and the lens surface of the rear unit Lr closest to the image side are convex surfaces. By forming the lens surface of the rear unit Lr closest to the object side by a convex surface, the height of the on-axis marginal ray passing through the rear unit Lr can be decreased. Thus, it is possible to shorten the effective diameter of the lenses included in the rear unit Lr and, as a result, to reduce the total size of the lens system.

By forming the lens surface of the rear unit Lr closest to the image side by a convex surface, telecentricity can be enhanced. When at least one embodiment of the optical system of the present disclosure is used in an image pickup apparatus including an image pickup element, it is preferable that a light beam should enter a light-receiving surface of the image pickup element from the perpendicular direction. If the incident angle of the light beam on the light-receiving surface increases, the light quantity decreases particularly at the peripheral image height, and the peripheral light quantity ratio becomes too low. In at least one embodiment of the present disclosure, the decrease in peripheral light quantity ratio is prevented by forming the lens surface of the rear unit Lr closest to the image side by a convex surface to enhance telecentricity. When the value is larger than the upper limit value or smaller than the lower limit value of Conditional Expression (5), it is difficult to suppress the decrease in peripheral light quantity ratio while achieving size reduction of the entire lens system.

Conditional Expression (6) defines the ratio of the overall lens length TD of the entire optical system and the focal length f of the entire optical system. When the overall lens length TD decreases so that the value becomes smaller than the lower limit value of Conditional Expression (6), the refractive powers of the lens surfaces are increased. When the refractive powers of the lens surfaces are increased, various aberrations occur, and this deteriorates optical performance of the optical system. When the overall lens length TD increases so that the value becomes larger than the upper limit value of Conditional Expression (6), the total size of the optical system is increased.

The numeral ranges of Conditional Expressions (2) to (6) are preferably set as follows:

$$1.40 < (G1R1+G1R2)/(G1R1-G1R2) < 4.00 \quad (2a)$$

$$1.30 < (G2R1+G2R2)/(G2R1-G2R2) < 4.50 \quad (3a)$$

$$1.05 < (G3R1+G3R2)/(G3R1-G3R2) < 3.00 \quad (4a)$$

$$0.03 \le |(R1+R2)|/(R1-R2) \le 0.80 \quad (5a)$$

$$10.00 < TD/f < 40.00 \quad (6a).$$

The numeral ranges of Conditional Expressions (2) to (6) are more preferably set as follows:

$$1.60 < (G1R1+G1R2)/(G1R1-G1R2) < 3.50 \quad (2b)$$

$$1.50 < (G2R1+G2R2)/(G2R1-G2R2) < 4.00 \quad (3b)$$

$$1.10 < (G3R1+G3R2)/(G3R1-G3R2) < 2.80 \quad (4b)$$

$$0.05 \le |(R1+R2)|/(R1-R2) \le 0.75 \quad (5b)$$

$$12.00 < TD/f < 35.00 \quad (6b).$$

The front unit Lf is preferably composed of seven or less lenses. In each embodiment, the optical system has an angle of view of about 180°, the effective diameter of each lens included in the front unit Lf is apt to be large, and the weight of each lens is also apt to be large. By composing the front unit Lf of seven or less lenses, the total weight of the front unit Lf can be effectively reduced. The rear unit Lr is preferably composed of five or less lenses. This can effectively achieve size reduction and weight reduction of the entire lens system.

In each embodiment, at least two aspherical lenses are preferably disposed in the optical system. By properly using the aspherical lenses, field curvature, astigmatism, and spherical aberration can be corrected well. In particular, an aspherical lens that is convex to the image side is preferably disposed on a side of the rear unit Lr closest to the image side. This can make the light incident angle on the image pickup element close to a telecentric condition, and can suppress the decrease in peripheral light quantity ratio.

When at least one embodiment of the optical system of the present disclosure is applied to an image pickup apparatus including an image pickup element that receives an image formed by the optical system, the following conditional expressions are preferably satisfied:

$$85° < \omega max < 120° \quad (7)$$

$$1.55 < Y80/f < 1.80 \quad (8)$$

$$0.20 < f^2/(Y80 \times Fno) < 2.50 \quad (9).$$

Here, ωmax represents the maximum half angle of view of the optical system, Y80 represents the image height on the image pickup element at an angle of view of 80°, f represents the focal length of the entire optical system, and Fno represents the full aperture F-number of the optical system at infinity.

When the maximum half angle of view ωmax is smaller than the lower limit value of Conditional Expression (7), a sufficiently wide viewing angle cannot be achieved. When the maximum half angle of view ωmax is larger than the upper limit value of Conditional Expression (7), the amount of information at each angle of view decreases, and this deteriorates resolution.

Conditional Expression (8) defines the shift of the image height at which a light beam having a half angle of view of 80° forms an image. In the stereographic projection method, the image height is determined by the focal length and the half angle of view, as described above. Here, when an image of a subject is formed on an imaging surface via the optical system in the stereographic projection method, distortion aberration occurs, and the image height shifts. When the value is smaller than the lower limit value of Conditional Expression (8), the image height at which the light beam having the half angle of view of 80° forms an image is too lower than the ideal image height, and information near the optical axis is excessively compressed. This may deteriorate image quality. When the value is larger than the upper limit value of Conditional Expression (8), the image height at which the light beam having the half angle of view of 80° forms an image is too higher than the ideal image height, and information in the peripheral area is excessively compressed. This may deteriorate image quality.

Conditional Expression (9) defines the hyperfocal distance of a pan-focus optical system. In the pan-focus optical system, all subject distances in a range from half the hyperfocal distance to infinity are within the depth of field. The closest in-focus distance is ½ of a hyperfocal distance sh. Here, the hyperfocal distance sh is expressed by $sh = f^2/(\varepsilon \times Fno)$ where ε represents the diameter of the permissible circle of confusion. The diameter ε of the permissible circle of confusion is proportional to a pixel pitch p, and is expressed by Exp. Further, when pixels are uniformly arranged in the image pickup element, since the pixel pitch p is proportional to the image height Y, the hyperfocal distance sh is proportional to $f^2/(Y \times Fno)$.

When the value is smaller than the lower limit value of Conditional Expression (9), the full aperture F-number Fno at infinity becomes too large, and it is difficult to ensure sufficient brightness. Moreover, the focal length f of the entire optical system becomes too short, and much aberration occurs. When the value is larger than the upper limit value of Conditional Expression (9), the closest in-focus distance increases, and the image taking area is narrowed.

In each embodiment, numerical ranges of Conditional Expressions (7) to (9) are preferably set as follows:

$$87° < \omega max < 115° \quad (7a)$$

$$1.59 < Y80/f < 1.77 \quad (8a)$$

$$0.25 < f^2/(Y80 \times Fno) < 2.00 \quad (9a).$$

The numerical ranges of Conditional Expressions (7) to (9) are more preferably set as follows:

$$89° < \omega max < 110° \quad (7b)$$

$$1.63 < Y80/f < 1.73 \quad (8b)$$

$$0.30 < f^2/(Y80 \times Fno) < 1.50 \quad (9b).$$

Next, the lens configurations in the embodiments will be described. In the optical systems of the first embodiment and the second embodiment, the front unit Lf consists of three negative lenses each having a meniscus shape that is convex to the object side and a cemented lens of a biconcave negative lens and a biconvex positive lens, which are arranged in order from the object side to the image side. By forming both surfaces of the third negative lens from the object side by aspherical surfaces, field curvature is corrected well. The rear unit Lr consists of a biconvex positive lens, a cemented lens of a biconcave negative lens and a biconvex positive lens, and a biconvex positive lens, which are arranged in order from the object side to the image side. By forming both surfaces of the positive lens closest to the image side by aspherical surfaces, field curvature and spherical aberration are corrected well.

In the optical system of the third embodiment, the front unit Lf consists of three negative lenses each having a meniscus shape that is convex to the object side, a biconcave negative lens, and a cemented lens of a meniscus negative lens that is convex to the object side and a biconvex positive lens, which are arranged in order from the object side to the image side. By forming both surfaces of the third negative lens from the object side by aspherical surfaces, field curvature is corrected well. The rear unit Lr consists of a biconvex positive lens, a cemented lens of a biconvex positive lens and a biconcave negative lens, and a biconvex positive lens, which are arranged in order from the object side to the image side. By forming both surfaces of the positive lens closest to the object side and both surfaces of the positive lens closest to the image side by aspherical surfaces, field curvature and spherical aberration are corrected well.

In the optical system of the fourth embodiment, the configuration of the front unit Lf is the same as that of the third embodiment. The rear unit Lr consists of a biconvex positive lens, a cemented lens of a meniscus positive lens that is convex to the image side and a biconcave negative lens, a biconvex positive lens, and a biconvex positive lens, which are arranged in order from the object side to the image side. By forming both surfaces of the positive lens closest to the object side and both surfaces of the positive lens closest to the image side in the rear unit Lr by aspherical surfaces, field curvature and spherical aberration are corrected well. In the optical system of the fifth embodiment, configurations of the front unit Lf and the rear unit Lr are the same as those adopted in the third embodiment.

Next, lens data in first to fifth numerical embodiments corresponding to the first to fifth embodiments of the present disclosure will be shown. In each numerical embodiment, i represents the order of an optical surface from the object side, ri represents the curvature radius of the i-th optical surface (i-th surface), di represents the distance between the i-th surface and (i+1)-th surface, and ndi and vdi represent the refractive index and Abbe number, respectively, of the material of the i-th optical member for the d-line.

When K represents the eccentricity, A4, A6, A8, and A10 each represent the aspherical surface coefficient, x represents the displacement amount from the surface vertex in the optical-axis direction at a height h from the optical axis, the aspherical surface shape is expressed by the following expression:

$$x(h^2/r)/[1+[1-(1+K)(h/r)^2]^{1/2}]+A4h^4+A6h^6+A8h^8+A10h^{10}$$

where r represents the paraxial curvature radius. Further, [e-Z] means $|10^{-Z}|$.

In each embodiment, the back focus (BF) refers to the distance from the surface of the lens system closest to the image side to the image plane expressed by the equivalent air length. Table 1 shows the correspondences of the numerical embodiments to the above-described conditional expressions.

First Numerical Embodiment

Unit mm

Surface data

| Surface number | r | d | nd | vd |
|---|---|---|---|---|
| 1 | 24.640 | 1.25 | 1.77250 | 49.6 |
| 2 | 10.334 | 3.08 | | |
| 3 | 13.519 | 1.00 | 1.95906 | 17.5 |
| 4 | 7.083 | 4.69 | | |
| 5* | 8.181 | 1.00 | 1.76802 | 49.2 |
| 6* | 3.330 | 3.00 | | |
| 7 | −13.041 | 0.60 | 1.59522 | 67.7 |
| 8 | 8.521 | 6.87 | 2.00069 | 25.5 |
| 9 | −15.485 | 1.65 | | |
| 10 (Stop) | ∞ | 1.10 | | |
| 11 | 5.634 | 4.46 | 1.49700 | 81.5 |
| 12 | −5.636 | 0.51 | | |
| 13 | −4.287 | 0.40 | 1.85478 | 24.8 |
| 14 | 10.208 | 2.72 | 1.49700 | 81.5 |
| 15 | −6.064 | 0.33 | | |
| 16* | 9.089 | 3.52 | 1.55332 | 71.7 |
| 17* | −7.138 | 1.46 | | |
| 18 | ∞ | 1.60 | 1.51630 | 64.1 |
| 19 | ∞ | 2.00 | | |
| Image plane | ∞ | | | |

Aspherical surface data

Fifth surface

K = −1.74182e+000    A6 = −5.36705e−005    A8 = 1.23192e−006
A10 = −3.06369e−009

Sixth surface

K = −1.16929e+000    A4 = 1.39638e−003    A6 = −1.20156e−004
A8 = −1.51135e−006    A10 = 2.35477e−007

Sixteenth surface

K = −1.89973e+000    A4 = −6.45750e−004    A6 = 2.02657e−005
A8 = −1.14090e−006    A10 = 1.46887e−008

Seventeenth surface

K = −7.98305e−001    A4 = 7.08293e−004    A6 = −1.49882e−005

Various data

| Focal length | 2.00 |
| F-number | 2.00 |
| Half angle of view | 90.20 |
| Image height | 4.00 |
| Overall lens length | 36.18 |
| BF | 4.51 |

Lens unit data

| Unit | Starting surface | Focal length |
|---|---|---|
| Front unit | 1 | −15.00 |
| Rear unit | 11 | 8.00 |

Second Numerical Embodiment

Unit mm

Surface data

| Surface number | r | d | nd | vd |
|---|---|---|---|---|
| 1 | 25.739 | 1.25 | 1.77250 | 49.6 |
| 2 | 11.637 | 3.01 | | |
| 3 | 14.589 | 1.00 | 1.95906 | 17.5 |

-continued

Unit mm

| | | | | |
|---|---|---|---|---|
| 4 | 8.566 | 4.89 | | |
| 5* | 8.545 | 1.00 | 1.76802 | 49.2 |
| 6* | 3.330 | 5.07 | | |
| 7 | −8.737 | 0.60 | 1.59522 | 67.7 |
| 8 | 10.806 | 5.67 | 2.00069 | 25.5 |
| 9 | −14.548 | 1.87 | | |
| 10 (Stop) | ∞ | 1.10 | | |
| 11 | 5.558 | 4.86 | 1.49700 | 81.5 |
| 12 | −5.560 | 0.54 | | |
| 13 | −4.083 | 0.40 | 1.85478 | 24.8 |
| 14 | 11.045 | 2.71 | 1.49700 | 81.5 |
| 15 | −6.148 | 1.24 | | |
| 16* | 9.090 | 3.98 | 1.55332 | 71.7 |
| 17* | −7.140 | 1.46 | | |
| 18 | ∞ | 1.60 | 1.51630 | 64.1 |
| 19 | ∞ | 2.00 | | |
| Image plane | ∞ | | | |

Aspherical surface data

Fifth surface

K = 3.37697e−001  A6 = −6.93664e−005  A8 = 1.99836e−006
A10 = −2.02822e−008

Sixth surface

K = −1.03997e+000  A4 = 1.46726e−003  A6 = −9.52085e−005
A8 = −1.69641e−006  A10 = 2.26511e−007

Sixteenth surface

K = −1.06802e+000  A4 = −7.50562e−004  A6 = 2.07296e−005
A8 = −1.04976e−006  A10 = 1.28819e−008

Seventeenth surface

K = −6.65735e−001  A4 = 6.16060e−004  A6 = −1.49996e−005

Various data

| | |
|---|---|
| Focal length | 2.00 |
| F-number | 2.00 |
| Half angle of view | 90.20 |
| Image height | 4.00 |
| Overall lens length | 39.19 |
| BF | 4.51 |

Lens unit data

| Unit | Starting surface | Focal length |
|---|---|---|
| Front unit | 1 | −12.00 |
| Rear unit | 11 | 8.97 |

Third Numerical Embodiment

Unit mm

Surface data

| Surface number | r | d | nd | vd |
|---|---|---|---|---|
| 1 | 25.195 | 1.20 | 1.80400 | 46.6 |
| 2 | 11.653 | 5.00 | | |
| 3 | 14.557 | 0.70 | 2.00100 | 29.1 |
| 4 | 6.859 | 4.19 | | |
| 5* | 20.501 | 0.50 | 1.80610 | 40.7 |
| 6* | 5.716 | 3.99 | | |
| 7 | −73.177 | 0.45 | 1.59522 | 67.7 |
| 8 | 9.142 | 0.86 | | |
| 9 | 13.936 | 0.45 | 2.10205 | 16.8 |
| 10 | 7.462 | 10.57 | 2.00069 | 25.5 |
| 11 | −13.962 | 4.64 | | |
| 12 (Stop) | ∞ | 2.56 | | |
| 13* | 6.320 | 1.94 | 1.49710 | 81.6 |

-continued

Unit mm

| | | | | |
|---|---|---|---|---|
| 14* | −17.197 | 0.09 | | |
| 15 | 66.768 | 1.39 | 1.49700 | 81.5 |
| 16 | −5.178 | 0.45 | 1.84666 | 23.8 |
| 17 | 16.143 | 2.64 | | |
| 18* | 13.935 | 3.54 | 1.55332 | 71.7 |
| 19* | −5.438 | 1.20 | | |
| 20 | ∞ | 1.50 | 1.51630 | 64.1 |
| 21 | ∞ | 2.24 | | |
| Image plane | ∞ | | | |

Aspherical surface data

Fifth surface

K = 2.00114e+000  A4 = −1.01987e−004  A6 = −5.72800e−006
A8 = −7.90180e−008  A10 = 2.62920e−009

Sixth surface

K = −7.26641e−002  A4 = −3.63561e−004  A6 = −2.44288e−005
A8 = −2.31468e−007  A10 = −2.01264e−009

Thirteenth surface

K = −3.51840e+000  A4 = 2.29819e−003  A6 = 3.07570e−004
A8 = −3.86576e−005  A10 = 3.46968e−006

Fourteenth surface

K = 4.84763e+000  A4 = 1.34834e−003  A6 = 2.43191e−004

Eighteenth surface

K = −3.04798e+000  A4 = −6.21861e−004  A6 = 2.90573e−005
A8 = 1.09122e−006  A10 = −4.37169e−008

Nineteenth surface

K = −3.38885e+000  A4 = −1.03947e−003  A6 = 4.88982e−005
A8 = 2.37243e−007

Various data

| | |
|---|---|
| Focal length | 2.00 |
| F-number | 2.00 |
| Half angle of view | 100.00 |
| Image height | 4.76 |
| Overall lens length | 45.16 |
| BF | 4.43 |

Lens unit data

| Unit | Starting surface | Focal length |
|---|---|---|
| Front unit | 1 | 15.03 |
| Rear unit | 13 | 9.14 |

Fourth Numerical Embodiment

Unit mm

Surface data

| Surface number | r | d | nd | vd |
|---|---|---|---|---|
| 1 | 30.469 | 1.20 | 1.83481 | 42.7 |
| 2 | 9.786 | 5.68 | | |
| 3* | 24.865 | 0.70 | 1.88202 | 37.2 |
| 4* | 7.378 | 4.35 | | |
| 5 | 80.368 | 0.50 | 1.80400 | 46.6 |
| 6 | 11.041 | 6.90 | | |
| 7 | −27.683 | 0.45 | 1.71300 | 53.9 |
| 8 | 13.140 | 0.63 | | |
| 9 | 16.036 | 0.45 | 1.95906 | 17.5 |
| 10 | 9.928 | 3.91 | 2.00069 | 25.5 |
| 11 | −16.600 | 10.80 | | |
| 12 (Stop) | ∞ | 0.47 | | |
| 13* | 20.010 | 1.14 | 1.49710 | 81.6 |

-continued

Unit mm

| | | | | |
|---|---|---|---|---|
| 14* | −20.005 | 0.50 | | |
| 15 | −14.518 | 1.06 | 1.48749 | 70.2 |
| 16 | −4.427 | 0.45 | 2.00100 | 29.1 |
| 17 | 85.011 | 0.55 | | |
| 18 | 14.918 | 2.34 | 1.49700 | 81.5 |
| 19 | −75.490 | 0.59 | | |
| 20* | 14.013 | 2.34 | 1.55332 | 71.7 |
| 21* | −4.798 | 9.98 | | |
| Image plane | ∞ | | | |

Aspherical surface data

Third surface

K = 9.26595e−001   A4 = 1.74251e−004   A6 = −9.19603e−008
A8 = −6.18843e−009

Fourth surface

K = −1.55179e+000   A4 = 3.15057e−004   A6 = 6.87929e−006

Thirteenth surface

K = 1.16740e+000   A4 = 1.89852e−004   A6 = 4.36520e−004
A8 = −2.12647e−005   A10 = 8.21093e−007

Fourteenth surface

K = −2.35943e+000   A4 = 6.47874e−004   A6 = 5.69574e−004

Twentieth surface

K = −1.60281e+000   A4 = −1.12845e−003   A6 = 6.14929e−006
A8 = 8.93187e−007   A10 = −4.26931e−008

Twenty-first surface

K = −1.83970e+000   A4 = −1.11349e−003   A6 = −9.48115e−006
A8 = 2.37243e−007

Various data

| | |
|---|---|
| Focal length | 1.50 |
| F-number | 2.80 |
| Half angle of view | 93.20 |
| Image height | 3.15 |
| Overall lens length | 55.00 |
| BF | 9.98 |

Lens unit data

| Unit | Starting surface | Focal length |
|---|---|---|
| Front unit | 1 | −78.27 |
| Rear unit | 13 | 8.24 |

Fifth Numerical Embodiment

Unit mm

Surface data

| Surface number | r | d | nd | vd |
|---|---|---|---|---|
| 1 | 25.144 | 1.20 | 1.80400 | 46.6 |
| 2 | 11.653 | 5.21 | | |
| 3 | 13.855 | 0.70 | 1.91082 | 35.3 |
| 4 | 6.859 | 4.19 | | |
| 5 | 73.515 | 0.50 | 1.73800 | 32.3 |
| 6 | 5.907 | 2.74 | | |
| 7 | −19.819 | 0.45 | 1.59522 | 67.7 |
| 8 | 9.142 | 1.38 | | |
| 9 | 14.767 | 0.45 | 1.95906 | 17.5 |
| 10 | 7.462 | 4.52 | 2.00069 | 25.5 |
| 11 | −13.220 | 6.79 | | |
| 12 (Stop) | ∞ | 1.40 | | |
| 13* | 6.320 | 1.45 | 1.49710 | 81.6 |
| 14* | −13.855 | 0.10 | | |

-continued

Unit mm

| | | | | |
|---|---|---|---|---|
| 15 | 66.768 | 1.14 | 1.48749 | 70.2 |
| 16 | −5.178 | 0.45 | 1.85478 | 24.8 |
| 17 | 23.099 | 3.69 | | |
| 18* | 13.935 | 3.98 | 1.55332 | 71.7 |
| 19* | −4.756 | 1.20 | | |
| 20 | ∞ | 1.50 | 1.51630 | 64.1 |
| 21 | ∞ | 2.28 | | |
| Image plane | ∞ | | | |

Aspherical surface data

Thirteenth surface

K = −4.32378e−001   A4 = 2.29819e−003   A6 = 3.07570e−004
A8 = 4.46609e−005   A10 = −7.05731e−006

Fourteenth surface

K = 2.72506e+000   A4 = 3.06342e−003   A6 = 5.10637e−004

Eighteenth surface

K = −3.04798e+000   A4 = −6.21861e−004   A6 = 2.90573e−005
A8 = 1.09122e−006   A10 = −3.89032e−008

Nineteenth surface

K = −3.38885e+000   A4 = −1.43938e−003   A6 = 5.31066e−005
A8 = 2.37243e−007

Various data

| | |
|---|---|
| Focal length | 2.02 |
| F-number | 2.40 |
| Half angle of view | 97.00 |
| Image height | 4.36 |
| Overall lens length | 40.34 |
| BF | 2.28 |

Lens unit data

| Unit | Starting surface | Focal length |
|---|---|---|
| Front unit | 1 | 471.79 |
| Rear unit | 13 | 8.23 |

TABLE 1

| | First Embodiment | Second Embodiment | Third Embodiment | Fourth Embodiment | Fifth Embodiment |
|---|---|---|---|---|---|
| Conditional Expression (1) | −0.53 | −0.75 | 0.61 | −0.11 | 0.02 |
| Conditional Expression (2) | 2.44 | 2.65 | 2.72 | 1.95 | 2.73 |
| Conditional Expression (3) | 3.20 | 3.84 | 2.78 | 1.84 | 2.96 |
| Conditional Expression (4) | 2.37 | 2.28 | 1.77 | 1.32 | 1.17 |
| Conditional Expression (5) | 0.12 | 0.12 | 0.08 | 0.61 | 0.14 |
| Conditional Expression (6) | 18.09 | 19.59 | 22.57 | 30.01 | 19.98 |
| Conditional Expression (7) | 90.20 | 90.20 | 100.00 | 93.20 | 97.00 |
| Conditional Expression (8) | 1.70 | 1.70 | 1.69 | 1.70 | 1.67 |
| Conditional Expression (9) | 0.59 | 0.59 | 0.59 | 0.32 | 0.50 |

Next, an embodiment of a monitoring camera (image pickup apparatus) using at least one embodiment of the optical system of the present disclosure as an image pickup optical system will be described with reference to FIG. 11. In FIG. 11, reference numeral 20 denotes a monitoring camera body. An image-taking optical system 21 is configured by any of the optical systems according to the above-described first to fifth embodiments. A solid-state image pickup element 22 (photoelectric conversion element), such as a CCD sensor or a CMOS sensor, is built in the monitoring camera body 20 and receives a subject image formed by the image-taking optical system 21.

By thus applying at least one embodiment of the optical system of the present disclosure to the image pickup apparatus such as the monitoring camera, a compact and wide-angle image pickup apparatus having high optical performance can be obtained.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-203190, filed Oct. 14, 2015, which is hereby incorporated by reference herein in its entirety.

What is claimed is:

1. An optical system comprising in order from an object side to an image side:
    a front unit including a plurality of lenses;
    an aperture stop; and
    a rear unit having a positive refractive power,
    wherein the front unit includes four negative lenses consecutively arranged from a side closest to the object side, and the following conditional expressions are satisfied:

$-0.90 < fr/ff < 0.75$, and $1.63 < Y80/f < 1.80$, where ff represents a focal length of the front unit, fr represents a focal length of the rear unit, Y80 represents an image height at a half angle of view of 80°, and f represents a focal length of the optical system.

2. The optical system according to claim 1, wherein the following conditional expression is satisfied:

$1.20 < (G1R1+G1R2)/(G1R1-G1R2) < 4.50$, where G1R1 and G1R2 represent a curvature radius of an object-side lens surface and a curvature radius of an image-side lens surface, respectively, of the lens disposed closest to the object side in the front unit.

3. The optical system according to claim 1, wherein the following conditional expression is satisfied:

$1.10 < (G2R1+G2R2)/(G2R1-G2R2) < 5.00$, where G2R1 and G2R2 represent a curvature radius of an object-side lens surface and a curvature radius of an image-side lens surface, respectively, of the second lens from the object side among the plurality of lenses included in the front unit.

4. The optical system according to claim 1, wherein the following conditional expression is satisfied:

$1.00 < (G3R1+G3R2)/(G3R1-G3R2) < 3.20$, where G3R1 and G3R2 represent a curvature radius of an object-side lens surface and a curvature radius of an image-side lens surface, respectively, of the third lens from the object side among the plurality of lenses included in the front unit.

5. The optical system according to claim 1, wherein the following conditional expression is satisfied:

$0.00 \le |(R1+R2)|/(R1-R2) \le 1.00$, where R1 represents a curvature radius of an object-side lens surface of a lens closest to the object side in the rear unit, and R2 represents a curvature radius of an image-side lens surface of a lens closest to the image side in the rear unit.

6. The optical system according to claim 1, wherein the following conditional expression is satisfied:

$7.00 < TD/f < 45.00$, where TD represents a distance on an optical axis from a lens surface closest to the object side in the front unit to a lens surface closest to the image side in the rear unit.

7. The optical system according to claim 1, wherein the front unit consists of seven or less lenses.

8. The optical system according to claim 1, wherein the rear unit consists of five or less lenses.

9. An image pickup apparatus, comprising:
    the optical system according to claim 1; and
    an image pickup element configured to receive an image formed by the optical system.

10. The image pickup apparatus according to claim 9, wherein the following conditional expression is satisfied:

$85° < \omega max < 120°$, where $\omega max$ represents a maximum half angle of view of the optical system.

11. The optical system according to claim 1, wherein the following conditional expression is satisfied:

$0.20 < f^2/(Y80 \times Fno) < 2.50$, where Fno represents a full aperture F-number of the optical system at infinity.

* * * * *